Figure 1A:
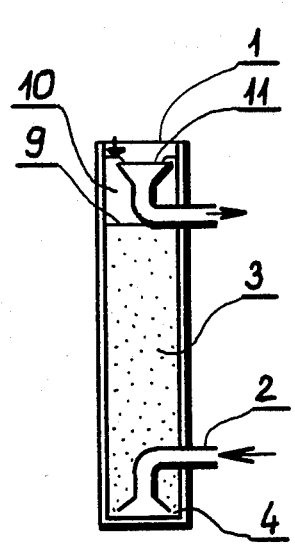

United States Patent [19]

Hereit et al.

[11] Patent Number: 4,511,467

[45] Date of Patent: Apr. 16, 1985

[54] APPARATUS FOR THE SIMULTANEOUS FORMATION AND SEPARATION OF A LIQUID SUSPENSION

[75] Inventors: Frantisek Hereit; Silvestr Mutl, both of Prague, Czechoslovakia

[73] Assignee: Hydroprojekt, Prague, Czechoslovakia

[21] Appl. No.: 401,749

[22] Filed: Jul. 26, 1982

[30] Foreign Application Priority Data

Jul. 27, 1981 [CS] Czechoslovakia ............... 5713-81

[51] Int. Cl.³ ............................................ B01D 15/00
[52] U.S. Cl. ................................. 210/173; 210/189; 210/198.1; 210/269
[58] Field of Search ............. 210/675, 769, 778, 792, 210/796, 807, 189, 193, 198.1, 199, 206, 269, 173

[56] References Cited

U.S. PATENT DOCUMENTS

| | | | |
|---|---|---|---|
| 3,075,828 | 1/1963 | Kato et al. | 210/715 |
| 3,171,801 | 3/1965 | Rice et al. | 210/290 |
| 4,349,442 | 9/1982 | Barraque et al. | 210/189 |
| 4,378,295 | 3/1983 | Axtmann | 210/792 |

*Primary Examiner*—Ivars Cintins

[57] ABSTRACT

Apparatus for the simultaneous formation and separation of a liquid suspension of particulate or granular material, such as admixtures of a colloidal character. The apparatus has a reactor, regeneration, and handling equipment, the reactor containing a fluid layer of granular material and being provided with feed piping of treated liquid into which input a supply of a destabilization agent is fed. The supply of destabilization agent is connected to the input piping for the treated liquid upstream of its mouth or discharge into the fluid layer within the reactor. The period of common flow of the destabilization agent and the treated liquid before it is fed into the fluid layer in the reactor may be, in some instances, longer than 120 seconds, and in other instances it may be shorter than 120 seconds. The reactor is connected to an equipment for drawing off covered particles of grains on the one hand, and to an equipment for the replenishment of the fluid layer within the reactor on the other hand.

3 Claims, 6 Drawing Figures

APPARATUS FOR THE SIMULTANEOUS FORMATION AND SEPARATION OF A LIQUID SUSPENSION

This invention relates to apparatus for removing undesireable admixtures, mostly of colloidal character, from liquids.

The present state of the art is such that in devices for the formation of suspensions, particles of undesirable admixtures are destabilized by the addition of one or more destabilization agents by stirring in mixing tanks. By such process water-bearing aggregates are formed which are successively caught in further devices, for example, in filters or in a system of devices, for example, in sedimentation tanks or in clarifiers and filters. The thus caught or trapped aggregates are periodically or continuously withdrawn from the separating devices in the form of a highly water-bearing sludge having a dry matter content of 0.01 to 1.0% by weight which has to be concentrated and dewatered in order to be stored satisfactorily as a waste unfit for use having a dry matter content of 20 to 40% by weight.

In a classical carrying out of the above process, each stage of the process takes place in a separate reservoir or equipment, the various reservoirs or equipment being mutually interconnected by pipelines or troughs. The dimensions and arrangement of the individual equipments are chosen according to the properties of the treated liquid and the requirements for the properties of the treated liquid; some equipment can be left out if need be.

In a more modern process, a combination of equipments are employed for the formation and separation of a suspension, such equipments forming one unit with variously formed and interconnected spaces in which single stages of the process take place. Sludge of the same character is produced by this more modern equipment as in the above-described classical apparatus for the same purpose.

The apparatus of the present invention represents an improvement over the above two described prior art devices for the formation of a suspension and the separation thereof. In accordance with the invention, there are employed a reactor and regeneration and handling equipment, the reactor having a fluid layer of granular material, there being a feed piping of treated material into which an input supply of a destabilization agent is lead.

The supply of destabilization agent is connected to input piping for the treated liquid before its discharge into the fluid layer of granular material. The time during which the destabilization agent and the treated liquid flow together before emerging from the input piping into the fluid layer may be shorter or longer than 120 seconds, depending upon the type of apparatus employed, and the reactor is connected to an equipment for drawing off the thus treated grains on the one hand and to an equipment for the replenishment of the fluid layer on the other hand. The equipment for drawing off the treated or covered grains has its outlet part connected to a regeneration device which is connected in turn to a storage means for the replenishment fluid layer. The regenerating equipment can be connected by a pipeline with the equipment for dosing the stabilization agent.

Between the equipment for drawing off the treated or covered grains and the equipment for the replenishment of a fluid layer there can be inserted crushing equipment which can also be located in the fluid layer of granular material. The fluid layer is formed by grains having a particle size up to and including 5 mm, and having a specific weight up to 5,200 kg. per cubic meter.

In a preferred embodiment of the apparatus of the invention the ratio of the water-free and the water-bearing aggregates can be so chosen that the apparatus can also be employed for the intensification of the operation of existing plants which are equipped with a device for the separation of water-bearing aggregates. In such case, the water-bearing aggregates formed by the device have more favorable properties for separation and dewatering than do aggregates formed by hitherto known commonly employed devices.

With a further connection according to the invention, when the origin of the solid anhydrous aggregates has priority, there are attained substantial savings with separating equipments by the use of the wastless closed technology of the present invention. With the employment of aluminum salts as the destabilization agent the waste is a valuable raw material in the production of aluminum. With the employment of ferric salts as the destabilization agent the waste can be used in metallurgical plants. The covered or treated grains of the fluid layer can also be used as a filter material.

Figure 1B:
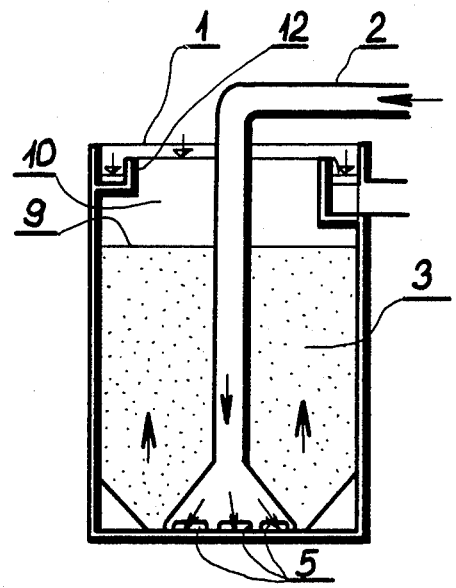
Figure 1C:
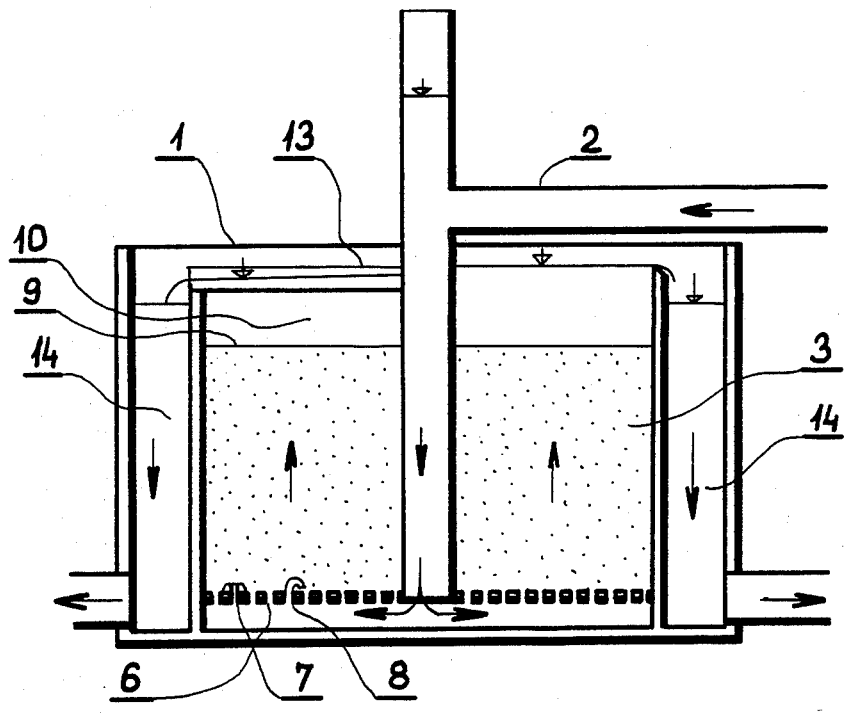
Figure 2:
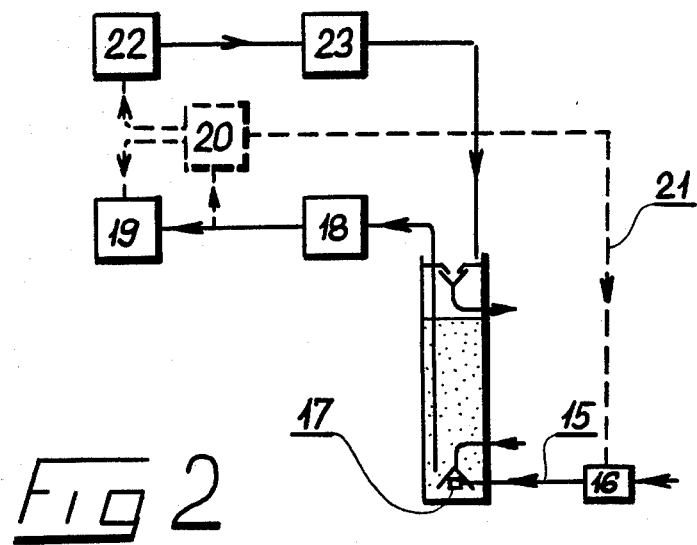
Figure 3:
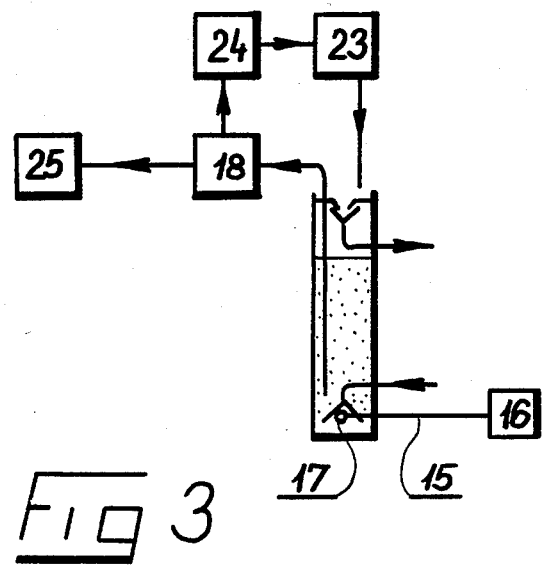
Figure 4:
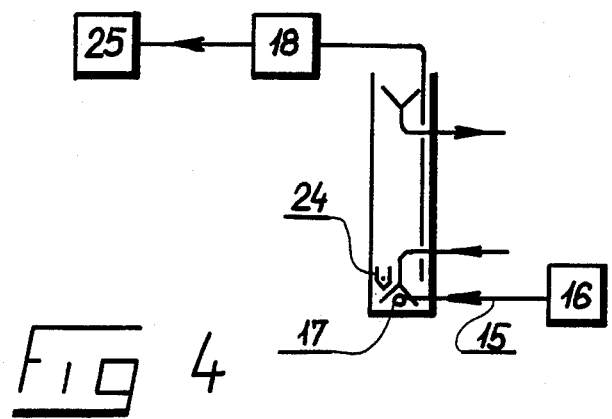

Exemplary embodiments of the apparatus according to the invention are shown schematically in the attached drawings, wherein:

FIG. 1a illustrates a reactor for low outputs;
FIG. 1b is a reactor for middle outputs;
FIG. 1c is a reactor for high outputs; and
FIGS. 2, 3 and 4 show three different embodiments, respectively, of apparatus according to the invention.

In each of the embodiments of reactors shown in FIGS. 1a, 1b and 1c there is shown a reactor 1 of circular or rectangular plan provided with a supply 2 of treated liquid. Distribution of the water into the fluid layer is effected by an equipment the construction of which depends mainly upon the size of the apparatus. In the apparatus of FIG. 1a distribution is effected through a slot 4 between the lower flared end of the intake pipe and the bottom of the enclosure for the reactor. In the embodiment of FIG. 1b distribution of water into the fluid layer of granular material is effected by distributing holes 5 near the bottom of the housing for the reactor; in the embodiment of FIG. 1c such distribution of water is accomplished by the provision of a grid-like intermediate bottom having holes 7 therein which form nozzles, and/or with bent tubes 8 extending upwardly and then downwardly from the holes 7. For this purpose there may also be alternatively employed water distributing equipment which is used, for example, in water supply rapid filter stations.

The fluid layer 3 of granular material has an upper boundry 9 above which there is provided a protective layer 10 of liquid; and off-take of treated liquid is employed, the construction of such off-take equipment depending upon the size of the reactor. In the embodiment of FIG. 1a such off-take equipment is a tubular overfall 11; in the embodiment of FIG. 1b it is a circumferential trough 12; and in the embodiment of FIG. 1c there are provided overfall troughs 13 and channels 14.

The reactor 1 according to each of the embodiments thereof shown in FIGS. 1a, 1b and 1c is connected in such a way that a liquid with dosed destabilization agent is led into it, the homogenization of such agent taking place before than 120 seconds before the inflow into the fluid layer 3. Such device fulfills the function of preparing the suspension for the following separation without any manifestation of the separating ability of the fluid layer 3 itself.

In the first illustrated system, shown in FIG. 2, destabilization agent is fed from a dosing equipment 16 into the bottom of the reactor 1. Homogenization of the destabilization agent and a granular material in the reactor 1 takes place at zone 17. Equipment 18 having a feed-in pipe extending downwardly within the reactor 1 into the zone 17 draws off the covered or homogenized grains. In the case in which the covered grains are not regenerated, they are forwarded to storage 19 by the equipment 18. When the separating ability of the fluid layer 3 is suppressed, the part of the unused grains is added from another storage 22 by equipment 23 into the fluid layer 3 as shown. Equipment 23 may transport such grains hydraulically or mechanically.

The separating efficiency is higher as the homogenization of the destabilization agent with water increases, and is less as the distance (expressed as time) between the homogenization zone 17 and the inflow into the fluid layer 3 decreases. Hydraulic ratios originated by narrowing the flow profile are usually used for homogenization. In this arrangement, destabilized admixtures aggregate at the surface of grains of the fluid layer 3 in the form of a solid, anhydrous cover. A mass excess gradually originates in the fluid layer 3 so that such mass has to be removed by equipment 18 after a period of time. The construction of such equipment depends upon the height to which the covered grains have to be transported; the equipment can be either only a pipeline with a suitable seal, a siphon, and injector, or a pump.

When it is more advantageous to regenerate the coated grains, then they are transported by using equipment 18 into regenerating equipment 20 wherein regeneration can be carried mechanically by crushing off the coated layer or by using physical methods, as for instance, by drying or cooling off the material. Regeneration can also be carried out chemically as well, by dissolution of the coated layer. It is advantageous to combine chemical regeneration with reactivation of the destabilization agent, which can be brought back by pipeline 21 into the dosing equipment 16, the original grains being then transported to storage 22 for replenishment of the fluid layer 3. Unless the coated grains are regenerated, it is possible to use them as filter material. In this case, they are stored in storage means 19, rather than being fed into the water-bearing layer 3.

The system according to FIG. 3 is employed in cases in which the suspension forming coating layer is used over again either as raw material in aluminum or iron production, or as basic material for other plants employing such technology. In these cases, such materials are employed for the fluid layer 3 which can be crushed to the required original size, and the properties of which do not interfere with the treatment of the coated layer. Crushed material obtained from other plants employing this technology, crushed material from thermally treated sludge from plants operating under classic technology, iron ore or bauxite, crushed coal or limestone, or other natural or artifically produced materials with analogous properties can be used as material for fluid layer 3, if need be.

In the system of FIG. 3, coated grains are transported by equipment 18 and separated into a part which has to be crushed in crushing equipment 24 to the size necessary for replenishment of the fluid layer 3, or for the needs of further plants, and into a part which is treated to rid it of water at storage 25 where it is stored until transport for other treatment. The system according to FIG. 4 has the same application as the system according to FIG. 3 with the difference that the equipment 24' for crushing the coated grains is located in the fluid layer 3.

Although the invention is illustrated and described with reference to a plurality of embodiments thereof, it is to be expressly understood that it is in no way limited to the disclosure of such preferred embodiments but is capable of numerous modifications within the scope of the appended claims.

I claim:

1. Apparatus for the formation of coating layers from a treated liquid upon the particles of a liquid suspension of particulate solid material and for thereafter separating the coating layers from the thus coated particles, said apparatus comprising a reactor and regenerating and handling equipment, the reactor being in the form of a container retaining a fluid layer of particulate material, a source of supply of treated liquid, feed piping connected between said source of supply and the container for conducting treated liquid into the reactor, a source of a destabilization agent, and means extending between the source of destabilization agent and the feed piping for feeding the destabilization agent into said feed piping, the supply of destabilization agent being connected to the feed piping for the treated liquid upstream of the discharge thereof into the fluid layer, the reactor being connected to an equipment for discharging the coated particles from the reactor and also being connected to an equipment for the replenishment of the fluid layer in the reactor, between the equipment for the discharge of the coated particles and the equipment for the replenishment of the fluid layer in the reactor there being interposed equipment for crushing the coated particles to remove the coating therefrom.

2. Apparatus according to claim 1, wherein the equipment for the discharge of the coated particles from the reactor is connected to the crushing equipment, and the crushing equipment is connected at its outlet part to means for the storage of the coated particles and part to transporting equipment for forwarding replenishment fluid to the fluid layer of the reactor.

3. Apparatus according to claim 1, wherein the crushing equipment is located in the fluid layer of particulate material in the reactor.

* * * * *